United States Patent [19]

Yoshizaki et al.

[11] Patent Number: 5,051,765
[45] Date of Patent: Sep. 24, 1991

[54] CAMERA

[75] Inventors: Akira Yoshizaki; Masataka Kashima; Akira Yamanaka; Haruo Kobayashi, all of Osaka, Japan

[73] Assignee: Minolta Camera Kabushiki Kaisha, Osaka, Japan

[21] Appl. No.: 453,254

[22] Filed: Dec. 20, 1989

Related U.S. Application Data

[63] Continuation of Ser. No. 145,239, Jan. 19, 1988, abandoned.

[30] Foreign Application Priority Data

Jan. 20, 1987 [JP] Japan .................. 62-11132

[51] Int. Cl.⁵ ............................................. G03B 17/04
[52] U.S. Cl. ................................ 354/187; 354/195.1; 354/288
[58] Field of Search ................ 354/195.1, 195.12, 288, 354/187, 159

[56] References Cited

U.S. PATENT DOCUMENTS

| | | | |
|---|---|---|---|
| 4,597,657 | 7/1986 | Wakabayashi | 354/195.12 |
| 4,771,303 | 9/1988 | Matsumoto et al. | 354/195.12 |
| 4,864,338 | 9/1989 | Wakabayashi | 354/195.12 X |

FOREIGN PATENT DOCUMENTS

| | | |
|---|---|---|
| 53-57818 | 5/1978 | Japan . |
| 59-22039 | 2/1984 | Japan . |
| 61-88137 | 6/1986 | Japan . |
| 61-101731 | 6/1986 | Japan . |
| 61-101733 | 6/1986 | Japan . |
| 61-116335 | 6/1986 | Japan . |
| 61-118734 | 6/1986 | Japan . |
| 61-118736 | 6/1986 | Japan . |
| 61-137138 | 6/1986 | Japan . |

OTHER PUBLICATIONS

"Modern Photography", Apr. 1988.
Appendix A "Photographic Industries", vol. 46, No. 4, Apr. 1, 1988.
Appendix B "Kamera Tuusin", Camera Communication, vol. 43, No. 3, published Mar. 20, 1988.

Primary Examiner—Michael L. Gellner
Attorney, Agent, or Firm—Burns, Doane, Swecker & Mathis

[57] ABSTRACT

A camera having a photographic optical system, a lens barrel disposed to be movable relative to a camera body in a direction of an optical axis and holding the photographic optical system, a focal length switchover mechanism for moving the photographic optical system such that the photographic optical system has a longer focal length as the same is moved forwardly in the direction of the optical axis, and a lens barrier displaceable between a closed position and an opened position for covering and uncovering a front face of the lens barrel. This lens barrier is disposed independently of the lens barrel adjacent a front end of the lens barrel having returned to a home position thereof at the side of the camera body such that the lens barrier is not movable in unison with the lens barrel. The lens barrel is moved to a projected position at which a front portion of the same is projected forwardly of the lens barrier when the focal length of the photographic optical system is set to be long by the focal length switchover mechanism. When the lens barrel is placed at the projected position and if the lens barrier is operated to its closed position, the lens barrel first returns to its home position before the lens barrier will close.

7 Claims, 3 Drawing Sheets

CAMERA

This application is a continuation of application Ser. No. 07/145,239, filed Jan. 19, 1988, abandoned.

BACKGROUND OF THE INVENTION

1. Field of the Invention

The present invention relates to a focal length switchover camera capable of selectively carrying out standard photography and telephotography, or standard photography and a wide-angle photography, or camera with an attached zoom lens capable of carrying out photography with its focal length being steplessly varied, and more particularly to a camera of the above type having focal length switchover means for switching over a focal length of a photographic optical system by moving a lens barrel holding the photographic optical system in a direction of an optical axis relative to a camera body and a lens barrel for opening and closing a front face of the lens barrel to protect the photographic optical system.

2. Description of the Prior Art

In the case of a conventional camera of the above-described type, the lens barrel is provided inside the lens barrel together with the photographic optical system. However, such a camera has drawbacks to be described hereinafter.

In the case of the camera having the lens barrier inside the lens barrel, it is necessary to dispose inside the lens barrel an opening-closing mechanism for opening and closing the lens barrier. Thus, the lens barrel tends to have a large radius. Moreover, since this lens barrel is to move along the optical axis relative to the camera body, it is also necessary to reserve sufficient space to permit the movement of the large-radius lens barrel. As a result, other components must be inconveniently disposed in the camera.

Furthermore, since the weight of the lens barrel necessarily increases as the lens barrier and the opening-closing mechanism are integrated therein, a mechanism for carrying out the focal length switchover tends to be large and complicated. This causes further inconvenience in the disposition of other components and increases cost as well.

SUMMARY OF THE INVENTION

Therefore, it is the primary object of the present invention to provide a camera in which the lens barrier is disposed without enlarging the radius of the lens barrel or complicating opening and closing operations of the lens barrier.

In order to achieve this object, a camera related to the present invention comprises;

a photographic optical system, a lens barrel disposed to be movable relative to a camera body in a direction of an optical axis and holding the photographic optical system, focal length switchover means for moving the photographic optical system such that the photographic optical system has a longer focal length when moved forwardly in the direction of the optical axis, and a lens barrier displaceable between a closed position and an opened position for covering and uncovering a front face of the lens barrel, the lens barrier being disposed independently of the lens barrel adjacent a front end of the lens barrel when returned to a home position i.e. its rearmost position and, the lens barrel being moved to a projected position at which a front portion of the same is projected forwardly of the lens barrel when the focal length of the photographic optical system is set to be long by the focal length switchover means.

According to the above construction, since the lens barrier is not moved in unison with the lens barrel, as compared with the conventional construction in which the lens barrier is provided inside the lens barrel, it becomes possible to reduce the radius and the weight of the lens barrel. Furthermore, since the lens barrier is disposed adjacent the front end of the lens barrel at its home position, it becomes easier to compactly form the whole camera.

In the case of the camera of the present invention, since it is possible to avoid the radius enlargement and weight increase of the lens barrel, the space for permitting the movement of the lens barrel along the optical axis may be reduced and the lens-barrel moving mechanism may be formed small and simple. As a result, it becomes possible to reserve more space for disposing other components in the camera and to achieve cost reduction.

Furthermore, according to a preferred embodiment of the present invention, there are provided urging means for urging the lens barrier towards its closed position side and operative means for moving the lens barrier to its opened position against an urging force of the urging means and for maintaining the lens barrier thereat. With this construction, it becomes possible to carry out the opening and closing operations of the lens barrier in a simple and reliable manner.

More specifically, the lens barrier may be opened by operating the operative means and at the same time the lens barrier may be readily closed simply by releasing the maintenance by the operative means of the lens barrier at its opened position. This is possible because of an arrangement as follows. If the lens barrel is currently placed at its home position, the lens barrier is immediately closed by the urging force of the urging means. On the other hand, if the lens barrel is placed at its projected position projected from the camera body, the lens barrier urged towards its closed position is temporarily prevented from moving towards the closed position because it comes into contact with a peripheral face of the lens barrel. The lens barrier is then closed by the urging force of the urging means when the lens barrel has reached its home position. Moreover, since the lens barrier is closed by the urging force, if this urging force is properly set, it is possible to prevent any occurrence of damages to the lens barrier and to the lens barrel when these come into contact with each other.

Further objects, features and advantages of the present invention will become more apparent from the following description of a preferred embodiment with reference to the accompanying drawings.

BRIEF DESCRIPTION OF THE DRAWINGS

Accompanying drawings illustrate a preferred embodiment of the present invention, in which.

DESCRIPTION OF THE PREFERRED EMBODIMENT

A preferred embodiment of the present invention will be particularly described hereinafter with reference to the accompanying drawings.

The embodiment, it is to be noted, will be described using a bifocal switchover camera by way of example of a focal length switchover camera capable of selectively carrying out standard photography and telephotography. However, the invention is also applicable to a multi-focal length switchover camera such as a trifocal length switchover camera or a camera having a zoom lens with a focal length which may be steplessly varied.

Figure 1:
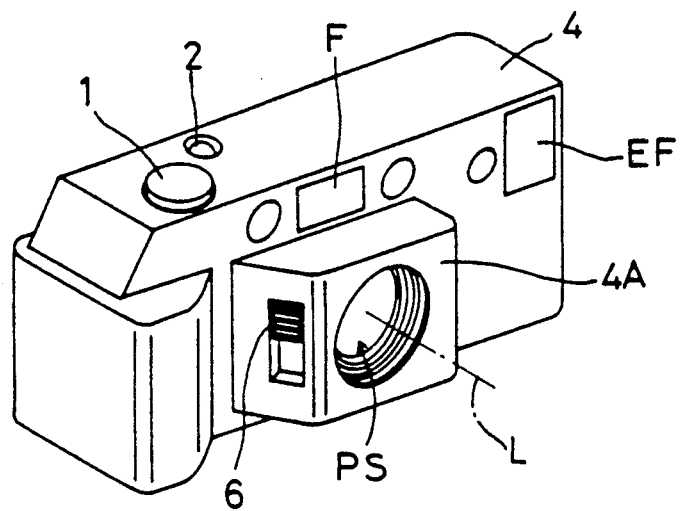
FIG. 1 is a perspective view of a camera related to the present invention in a standard photography condition.
Figure 2:
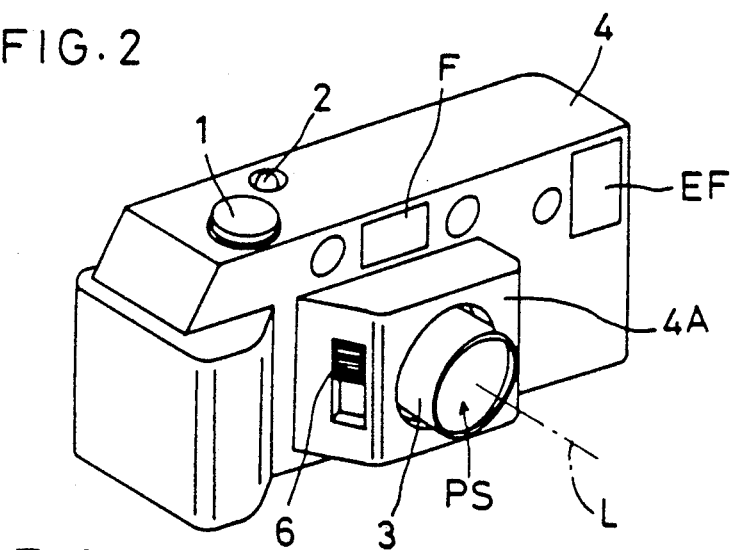
FIG. 2 is a perspective view of the camera in a telephotography condition.
Figure 3:
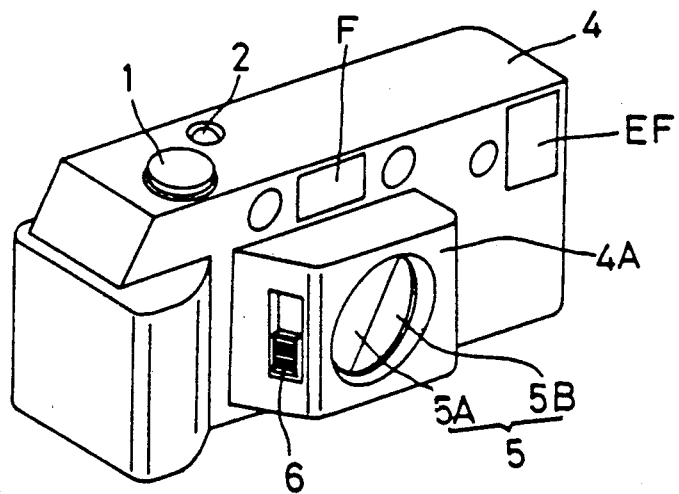
FIG. 3 is a perspective view of the camera with a lens barrier being closed.

FIGS. 1 through 3 are perspective views showing a camera according to the present invention. In these figures, a reference numeral 1 denotes a shutter release button and a numeral 2 denotes a focal length switchover button for switching over a focal length of a photographic optical system PS to be described later.

With each depressing operation of this focal length switchover button 2, the focal length of the photographic optical system PS is switched over between a standard photography condition in which the focal length is e.g. 50 mm and a telephotography condition in which the focal length is e.g. 70 mm.

A movable lens barrel 3, which is an example of a lens barrel for holding the photographic optical system PS, is movable relative to a camera body 4 in a direction of an optical axis L.

FIG. 1 shows an initial condition in which the photographic optical system PS is focused at infinity in the standard photography condition. In this condition, the movable lens barrel 3 is accommodated inside a fixed outer cylinder 4A provided continuously with the camera body 4 and is placed at its home position i.e. a rearmost position. FIG. 2 shows another initial condition in which the photographic optical system PS is focused at infinity in the telephotography condition. In this condition, the movable lens barrel 3 projects from the fixed outer cylinder 4A.

Switchover operations between the above-described two focal lengths by movements in the direction of the optical axis L of the movable lens barrel 3 holding the photographic optical system PS are carried out by drive of a motor accommodated in the camera body 4. This motor will be more particularly described later. This drive of the same motor is utilized also to carry out focus adjustment operations in the respective focal length conditions.

These focus adjustment operations in the respective focal length conditions are executed with a depressing operation of the shutter release button 1. In the standard photography condition, the focus adjustment operation is carried out in such a way that the focus of the photographic optical system PS is shifted from the infinity position to the closest focus position as the movable lens barrel 3 is forwarded in the direction of the optical axis L from the initial condition shown in FIG. 1. On the other hand, in the telephotography condition, the focus adjustment operation is carried out in the same way as the movable lens barrel 3 is forwarded in the direction of the optical axis L from the initial condition shown in FIG. 2.

After both the focus adjustment operation and the photographic operation are completed, the movable lens barrel 3 returns to the initial condition shown in FIG. 1 or FIG. 2, depending on the focal length condition.

On the other hand, at a leading edge of the fixed outer cylinder 4A, i.e. at an area slightly forward of a front end of the movable lens barrel 3 having returned to its home position at the side of the camera body 4, there is provided a lens barrier 5 for opening and closing the front face of the movable lens barrel 3 thereby protecting the photographic optical system PS. Furthermore, at a side of the fixed outer cylinder 4A, there is provided an operative lever 6 for operating the lens barrel 5 between its open and closed conditions. FIG. 3 shows a condition in which the lens barrier 5 is in its closed condition.

In the same figure, a reference mark F denotes a view finder window and a mark EF denotes an electronic flash device.

Figure 4:
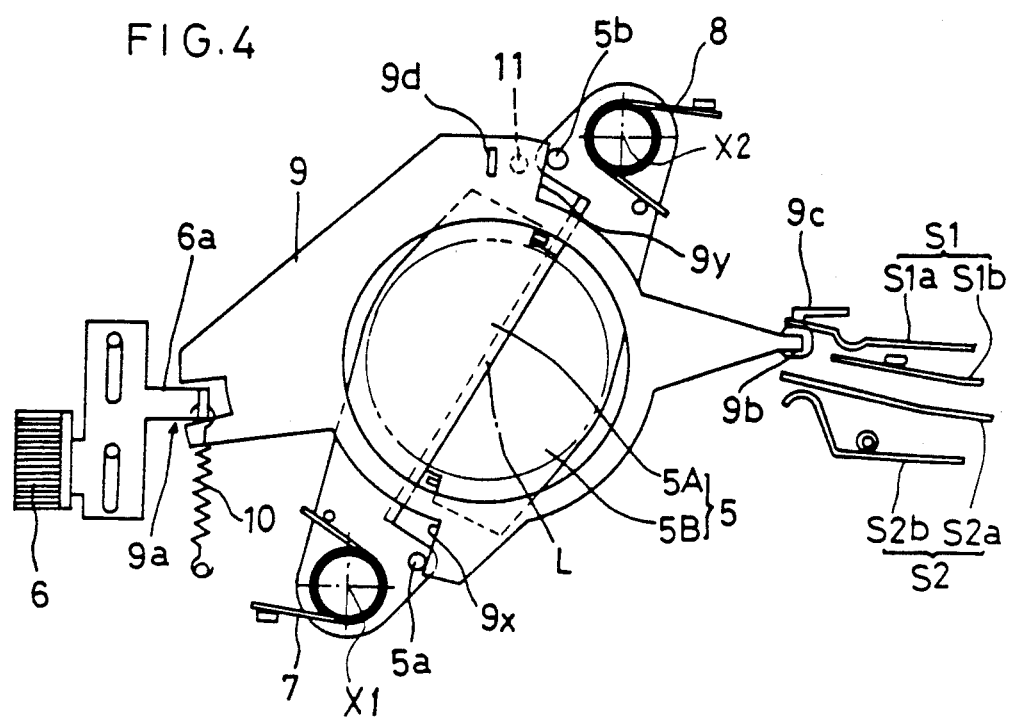
FIG. 4 is a schematic front view of a lens barrier portion with the lens barrier being closed.
Figure 5:
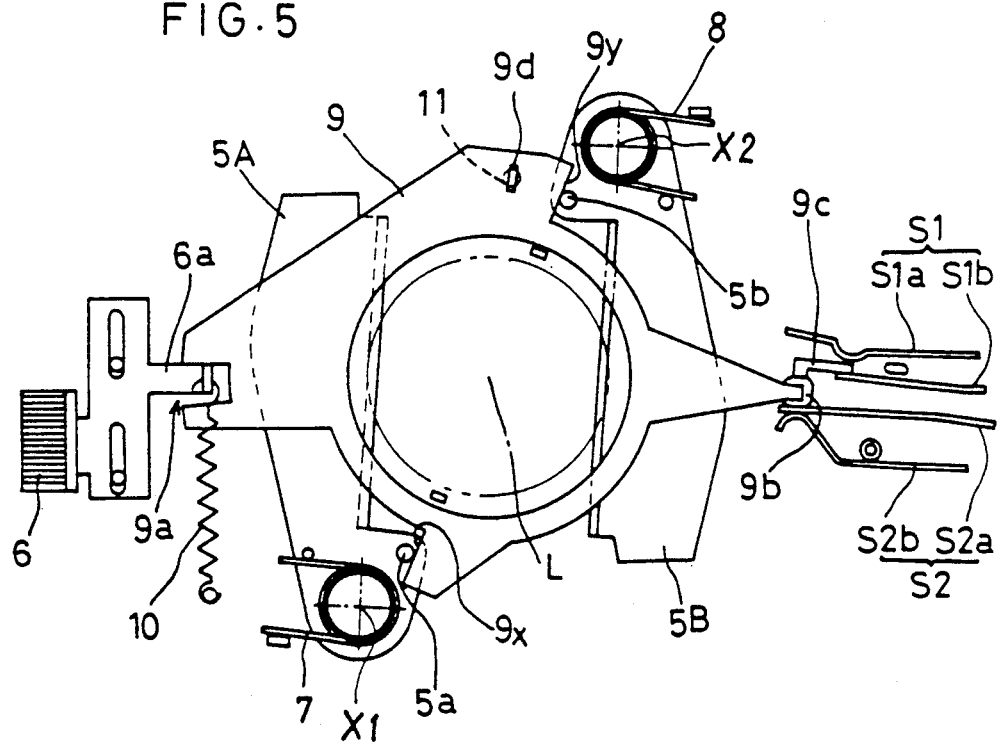
FIG. 5 is a schematic front view of the lens barrier portion with the lens barrier being opened.
Figure 6:
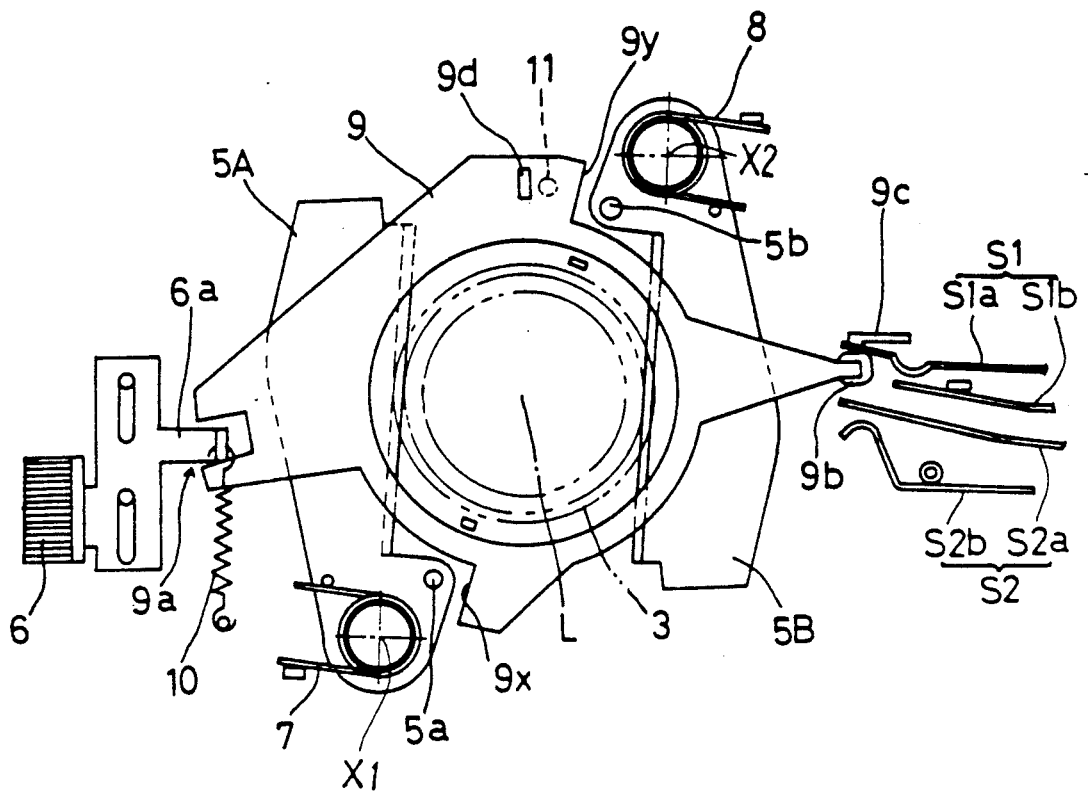
FIG. 6 is a schematic front view of the lens barrier portion when the lens barrier is closed with a movable lens barrel being projected from a camera body.

As shown in FIGS. 4 through 6, the lens barrier 5 includes a pair of blades 5A and 5B independently pivotable about attaching axes X1 and X2, respectively. Also, there are provided springs 7 and 8 for the blades respectively which constitute an example of urging means for urging the pair of blades 5A and 5B towards their respective closed positions.

Furthermore, there is provided an operative member 9 having an engaging portion 9a for engaging with a projection 6a of the operative lever 6 and pivoting about the optical axis L in connection with a vertical movement of the operative lever 6.

The operative member 9 further includes two switch-operating portions 9b and 9c, opposed to which there are provided four elements S1a, S1b, S2a and S2b constituting two switches S1 and S2 for detecting the opened or closed condition of the lens barrier 5.

FIG. 4 shows a condition in which the lens barrier 5 is in its closed condition. In this condition, the operative lever 6 is placed downwardly in the same figure by an urging force of a spring 10 and the operative member 9 which is operatively connected to this operative lever 6 is at a position most suitable for pivoting counterclockwise about the optical axis L.

In this condition, a pair of operative portions 9x and 9y formed on the operative member 9 are in contact with operative pins 5a and 5b implanted in the two blades 5A and 5B constituting the lens barrier 5, with the two blades 5A and 5B being placed at their respective closed positions by the urging forces of the springs 7 and 8 repectively.

Also, the upper first element S1a constituting the first switch S1 of the aforementioned two switches S1 and S2 is lifted by the first switch-operating portion 9b of the operative member 9 whereby this first switch S1 is opened.

From the above condition, if the operative lever 6 is operated upwardly in the same figure, the operative member 9 is pivoted clockwise about the optical axis L. With this clockwise pivotal movement, the pair of operative portions 9x and 9y of the operative member 9 depress the operative pins 5a and 5b of the blades 5A and 5B thereby pivoting counterclockwise these two blades 5A and 5B respectively about the attaching axes X1 and X2 against the urging forces of the springs 7 and 8.

Thereby, the blades 5A and 5B are moved to their respective opened positions and the lens barrier 5 is operated to its opened condition as shown in FIG. 5.

At the side of the camera body 4, there is provided a spring ball 11 urged by a spring (not shown) to come into contact with a back face of the operative member 9. On the other hand, the operative member 9 defines an engaging hole 9d engagable with this spring ball 11.

When the two blades 5A and 5B have been pivoted to their opened positions, the spring ball 11 comes into engagement with the engaging hole 9d of the operative member 9. An urging force of the spring for urging the spring ball 11 is arranged to be stronger than the urging force of the spring 10 for downwardly urging the operative lever 6, thereby maintaining the positions of the operative member 9 and of the operative lever 6.

That is to say, the operative lever 6, operative member 9, spring ball 11 and so on constitute operative means for moving the lens barrier 5 to its opened position against the urging forces of the springs 7 and 8, which are the urging means, and maintaining the barrier 5 under this condition.

Also, with a clockwise pivotal movement of the operative member 9 about the optical axis L, its first switch-operating portion 9b moves away from the first element S1a of the first switch S1. Thereby, this first element S1a pivots downwardly by its own elasticity to come into contact with the lower second element S1b, whereby the first switch S1 is closed.

Thereafter, with a further pivotal movement of the operative member 9, its second switch-operating portion 9c comes into contact with the second element S1b of the first switch S1 to pivot this second element S1b downwardly, whereby the first switch S1 is opened.

Concurrently with the above operations, as the first switch-operating portion 9b of the operative member 9 downwardly pivots the upper first element S2a of the second switch S2, this upper first element S2a comes into contact with the lower second element S2b thereby closing the second switch S2.

In the condition of FIG. 5 in which the lens barrier is under its opened condition, all of the focal length switchover operations between the standard photography condition and the telephotography condition and the focus adjustment operations in the respective photography conditions are carried out by the movements of the movable lens barrel 3 holding the photographic optical system PS along the direction of the optical axis L.

If the operative lever 6 is operated downwardly in the lens barrier-opened condition shown in FIG. 5, the lens barrier 5 moves in different manners depending on a position of the movable lens barrel 3.

In the initial condition of the standard photography condition in which the movable lens barrel 3 is accommodated inside the fixed outer cylinder 4A of the camera body 4 and has returned to its home position, the above depressing operation of the operative lever 6 pivots the operative member 9 counterclockwise in FIG. 5. Thereby, the engagement between the engaging hole 9d of the operative member 9 and the spring ball 11 is broken, and thereafter, the operative member 9 continues its counterclockwise pivotal movement by the urging force of the spring 10 for the operative lever 6.

With the above counterclockwise pivotal movement of the operative member 9, the operative portions 9x and 9y stop urging the operative pins 5a and 5b of the two blades 5A and 5B of the lens barrier 5. Accordingly, these two blades 5A and 5B are pivoted clockwise about the attaching axes X1 and X2 by the urging forces of the springs 7 and 8 to return to their closed positions shown in FIG. 4.

Also with the counterclockwise pivotal movement of the operative member 9, in a manner opposite to the above-described opening operation of the lens barrier 5, the second switch S2 is firstly opened and at the same time the first switch S1 is closed, and then the first switch S1 is opened.

On the other hand, in the condition in which the movable lens barrel 3 projects outwardly from the fixed outer cylinder 4A of the camera body 4, (i.e. the condition in which the movable lens barrel 3 is forwarded by a focus adjustment operation in the standard photography condition, and also in the telephotography condition,) with a depressing operation of the operative lever 6, in the same manner as the previous case, the engagement between the engaging hole 9d of the operative member 9 and the spring ball 11 is broken and the operative member 9 is pivoted counterclockwise in FIG. 6. In this case however, since the movable lens barrel 3 projects outwardly from the fixed outer cylinder 4A, the two blades 5A and 5B of the lens barrier 5 which are pivoted clockwise by the urging forces of the springs 7 and 8 after the pair of operative portions 9x and 9y of the operative member 9 stop urging the operative pins 5a and 5b, come into contact with a peripheral face of the movable lens barrel 3 and are maintained at this position. This condition is shown in FIG. 6.

In this condition, the operative member 9 has been returned by the urging force of the spring 10 for the operative lever 6 to the position pivoted most counterclockwise about the optical axis L. Also, with the counterclockwise pivotal movement of the operative member 9, in the same manner as the previously described closing operation of the lens barrier 5 in the standard photography condition, the first switch S1 is closed when the second switch S2 is opened and thereafter the first switch S1 is opened.

Then, from the condition shown in FIG. 6, the movable lens barrel 3 is moved along the optical axis L to reach its home position at the camera body 4. Thereby, the two blades 5A and 5B of the lens barrier 5 come out of contact with the peripheral face of the movable lens barrel 3 and are pivoted clockwise about the attaching axes X1 and X2 by the urging forces of the springs 7 and 8 to reach their respective closed positions shown in FIG. 4.

Figure 7:
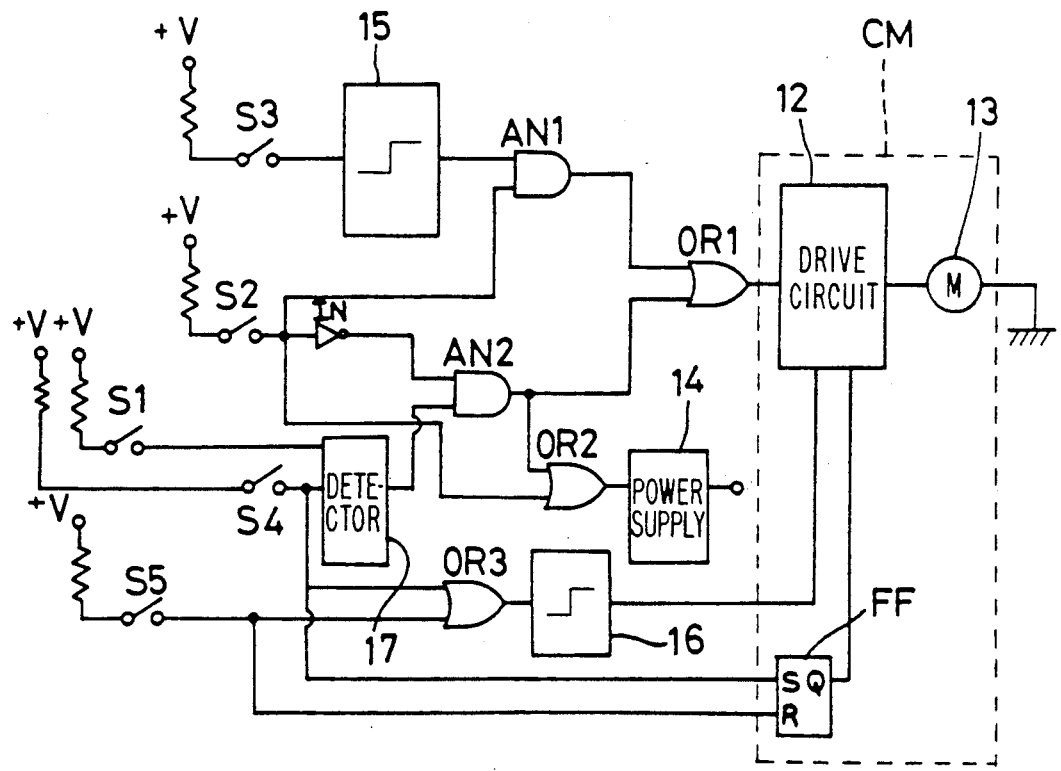
FIG. 7 is a diagram of a circuitry partially constituting a control system of the camera.

FIG. 7 is a diagram of a circuitry partially constituting a control system of this camera.

In the same figure, the reference marks S1 and S2 are the above-described first and second switches for detecting the opened and closed conditions of the lens barrier 5. A reference mark S3 denotes a focal length switchover switch which is closed with a depressing operation of the focal length switchover button 2 and activates focal length switchover means to be described later. Reference marks S4 and S5 respectively denote a standard photography initial condition detecting switch and a telephotography initial condition detecting switch which are closed when the photographic optical system PS is focused at infinity in the standard photography condition and in the telephotography condition respectively.

A reference mark FF denotes a flip-flop which is set by a closure of the standard photography initial condition detecting switch S4 and is reset by a closure of the telephotography initial condition detecting switch S5. The output of this flip-flop through its output terminal Q is in the 'H' (high) level when the flip-flop is in its set state and the same is in the 'L' (low) level when the flip-flop is in its reset state.

A reference numeral 12 denotes a lens barrel driving circuit. This circuit, depending on the level (H or L) of the output of the flip-flop FF through its output terminal Q, generates a drive control signal for a normal rotation or a reverse rotation to a motor 13 for driving the movable lens barrel 3 holding the photographic optical system PS along the optical axis L forwardly or backwardly.

That is to say, the flip-flop FF, lens barrel driving circuit 12, motor 13 and so on constitute the focal length switchover means CM for switching over the focal length of the photographic optical system PS.

A reference numeral 14 denotes a power supply circuit which supplies power to the lens barrel driving circuit 12, to a film driving circuit (not shown) for winding up and rewinding a film, to a charging circuit (not shown) for charging the electronic flash device EF for carrying out a flash photography and so on.

Reference numerals 15 and 16 both denote one-pulse generating circuits each for generating an 'H' signal in the form of pulse when an input signal rises to its 'H' level. A reference numeral 17 denotes a focal length switchover detecting circuit for generating an 'L' signal only when the standard photography initial condition detecting switch S4 is closed.

Reference marks AN1 and AN2 denote AND gates, marks OR1 through OR3 denote OR gates and a mark IN denotes an inverter gate, respectively.

The power supply circuit 14 receives an output from the OR gate OR2 to which the second switch S2 is connected. In operation, when the second switch S2 is closed with an opening operation of the lens barrier 5, the output from this OR gate OR2 is switched to 'H', thereby providing power from the power supply to the respective circuits. That is to say, the second switch S2 acts also as a power supply switch.

When the lens barrier 5 is opened, if the focal length switchover switch S3 is closed with a depressing operation of the focal length switchover button 2, the one-pulse generating circuit 15 generates an 'H' signal in the form of pulse.

Since the second switch S2 acting also as a power supply switch is closed, the AND gate AN1 is unblocked and the 'H' pulse signal from the one-pulse generating circuit 15 is input through the AND gate AN1 and the OR gate OR1 to the lens barrel driving circuit 12. Receiving this pulse signal, the lens barrel driving circuit 12 generates a drive control signal for driving the motor 13 in the normal or reverse direction depending on the state of the output from the output terminal Q of the flip-flop FF.

Thereby, the movable lens barrel 3 is moved along the optical axis L from its present position. More specifically, in the standard photography condition, the output from the output terminal Q of the flip-flop FF is in the 'H' level since the standard photography initial condition detecting switch S4 is closed whereby the motor 13 rotates in the normal direction to deliver the movable lens barrel 3 towards its position projected from the camera body 4. On the other hand, in the telephotography condition, the output from the output terminal Q of the flip-flop FF is in the 'L' level since the telephotography initial condition detecting switch S5 is closed whereby the motor 13 rotates in the reverse direction to deliver the movable lens barrel 3 towards its position recessed into the fixed outer cylinder 4A of the camera body 4.

In either of the cases, when the standard photography initial condition detecting switch S4 or the telephotography initial condition detecting switch S5 is closed, the output from the OR gate OR3 is switched to 'H' and the 'H' pulse signal output from the one-pulse generating circuit 16 is input to the lens barrel driving circuit 12. Thereby, the lens barrel driving circuit 12 generates a drive control signal for stopping the rotation of the motor 13.

When the lens barrier 5 is under its closed condition, the second switch S2 is opened, whereby one of inputs to the AND gate AN1 is switched to 'L' and this AND gate AN1 is blocked. Accordingly, even if the one-pulse generating circuit 15 generates an 'H' signal, this 'H' signal is not input to the lens barrel driving circuit 12 and no drive control signal is generated to cause the motor 13 to rotate.

That is to say, when the lens barrier 5 is closed, even if the focal length switchover button 2 is depressed, the movable lens barrel 3 is not moved.

As described hereinbefore, when the lens barrier 5 is opened, if the operative lever 6 is depressed downwardly to close this lens barrier 5, different operations are carried out depending on a position of the movable lens barrel 3. Operations of the control device in these cases will be particularly described next.

Both in the standard photography condition in which the movable lens barrel 3 is accommodated inside the fixed outer cylinder 4A of the camera body 4 and in the telephotography condition in which the same is projected from the fixed outer cylinder 4A, as described hereinbefore, with the pivotal movement of the operative member 9 by the downward movement of the operative lever 6, firstly, the second switch S2 is opened and at the same time the first switch S1 is closed, and then the first switch S1 is opened.

With the opening of the second switch S2, the output from the inverter gate IN is switched to 'H' thereby unblocking the AND gate AN2.

When the first switch S1 is closed, if the standard photography initial condition detecting switch S4 is closed, i.e. in the initial condition of the standard photography condition in which the movable lens barrel 3 is at its home position at the camera body 4, the output of the focal length switchover detecting circuit 17 is in the 'L' level and so is the output from the AND gate AN2. Accordingly, an 'L' signal is input through the OR gate OR1 to the lens barrel driving circuit 12 and through the OR gate OR2 to the power supply circuit 14, whereby neither of these circuits 12 and 14 are energized.

On the other hand, when the first switch S1 is closed, if the standard photography initial condition detecting switch S4 is opened, this means that the camera is in the telephotography condition and the telephotography initial condition detecting switch S5 is closed. Accordingly, the output from the focal length switchover detecting circuit 17 is switched to 'H' and so is the output from the AND gate AN2.

As a result, the input to the power supply circuit 14 remains in the 'H' level and the 'H' signal is input through the OR gate OR1 to the lens barrel driving circuit 12. In this condition, since the output from the output termial Q of the flip-flop FF is in the 'L' level, the motor 13 rotates in the reverse direction thereby delivering the movable lens barrel 3 into the camera body 4.

Thereafter, when the movable lens barrel 3 has reached its home position at the lens body 4 and the standard photography initial condition detecting switch S4 is closed, these circuits 12 and 14 become inoperative.

In the foregoing embodiment, the rearmost position is defined as the home position. However, in such a camera as a lens is retracted from a close focusing position to a infinite postion, its home position is defined as a position slightly forwarded from its rearmost position.

What is claimed is:

1. A camera comprising:
   a photographic optical system;
   a lens barrel housing at least part of said optical system and being movable relative to a camera body in a direction of an optical axis for adjusting the focal length of said optical system;
   selecting means for selecting the focal length of said optical system;
   setting means for setting the focal length which is selected by said selecting means by moving said lens barrel in the direction of the optical axis of said optical system and thereby determining an axial position of said optical system;
   a lens barrier which is provided on said camera body, said lens barrier being positioned at a position adjacent a front end of said lens barrel when said lens barrel is at an axial position retracted into the camera body and positioned at a position retracted from the front end of said lens barrel when said lens barrel is at an axial position projected from the camera body, said lens barrier being movable between a closed position and an open position for covering and uncovering a front face of said lens barrel thereby covering the front face when said lens barrel is at the retracted position;
   urging means for resiliently urging said lens barrier to move to its closed position; and
   means for starting movement of said lens barrier to the closed position by an urging force of said urging means and for correspondingly starting movement of said lens barrel to its retracted position such that said lens barrier is temporarily stopped against the urging force of said urging means by said lens barrel until the front end of said lens barrel is retracted from said lens barrier when said lens barrier comes into contact with said lens barrel during the closing movement of said lens barrel.

2. A camera as claimed in claim 1, wherein said setting means includes electric driving means for moving said lens barrel.

3. A camera as claimed in claim 2, further comprising:
   first operative means for activating said setting means; and
   second operative means for triggering the displacement of said lens barrier.

4. A camera as claimed in claim 3, further comprising:
   detecting means for detecting a moved position of said lens barrel;
   wherein said electric driving means moves said lens barrel rearward of said lens barrier when said second operative means triggers the displacement of said lens barrier to the closed position and at the same time said detecting means detects that said lens barrel is placed at the projected position.

5. A camera as claimed in claim 1, wherein said axial position retracted into the camera body is a rearmost position.

6. A camera comprising:
   a photographic optical system;
   a lens barrel movable relative to a camera body in a direction of an optical axis and holding said photographic optical system;
   focal length switchover means for moving said photographic optical system such that said photographic optical system has a longer focal length as the photographic optical system is moved forwardly in the direction of the optical axis;
   a lens barrier displaceable between a closed position and an opened operating position for covering and uncovering a front face of said lens barrel, said lens barrier being disposed independently of said lens barrel adjacent a front end of said lens barrel when said lens barrel is retracted to a home position on the camera body;
   said lens barrel being moved to a projected position at which a front portion of the lens barrel is projected forwardly of said lens barrier when the focal length of said photographic optical system is set to be long by said focal length switchover means; and
   control means including;
   a driving means for driving said focal length switchover means,
   barrier operating means movable between a first position for operating said lens barrier to said operating position and a second position for starting said lens barrier to said closed position,
   urging means for resiliently urging said lens barrier in a direction from said opened position to said closed position in response to movement of said barrier operating means from said first position to said second position,
   detecting means for detecting that said lens barrel is placed at said projected position,
   said control means controlling said lens barrel to start its movement rearward of said lens barrier correspondingly with the start of said lens barrier if said barrier operating means is moved from said first position to said second position and said detecting means detects that said lens barrel is at said projected position such that said lens barrier is temporarily stopped against the urging force of said urging means by said lens barrel until the front face of said lens barrel is retracted from said lens barrier when said lens barrier comes into contact with said lens barrel during the closing movement of said lens barrier.

7. A camera as claimed in claim 6 wherein said home position is a rearmost position.

* * * * *